W. R. CLOSE.
Improvement in Shingle-Machines.
No. 4,371. Reissued May 9, 1871.
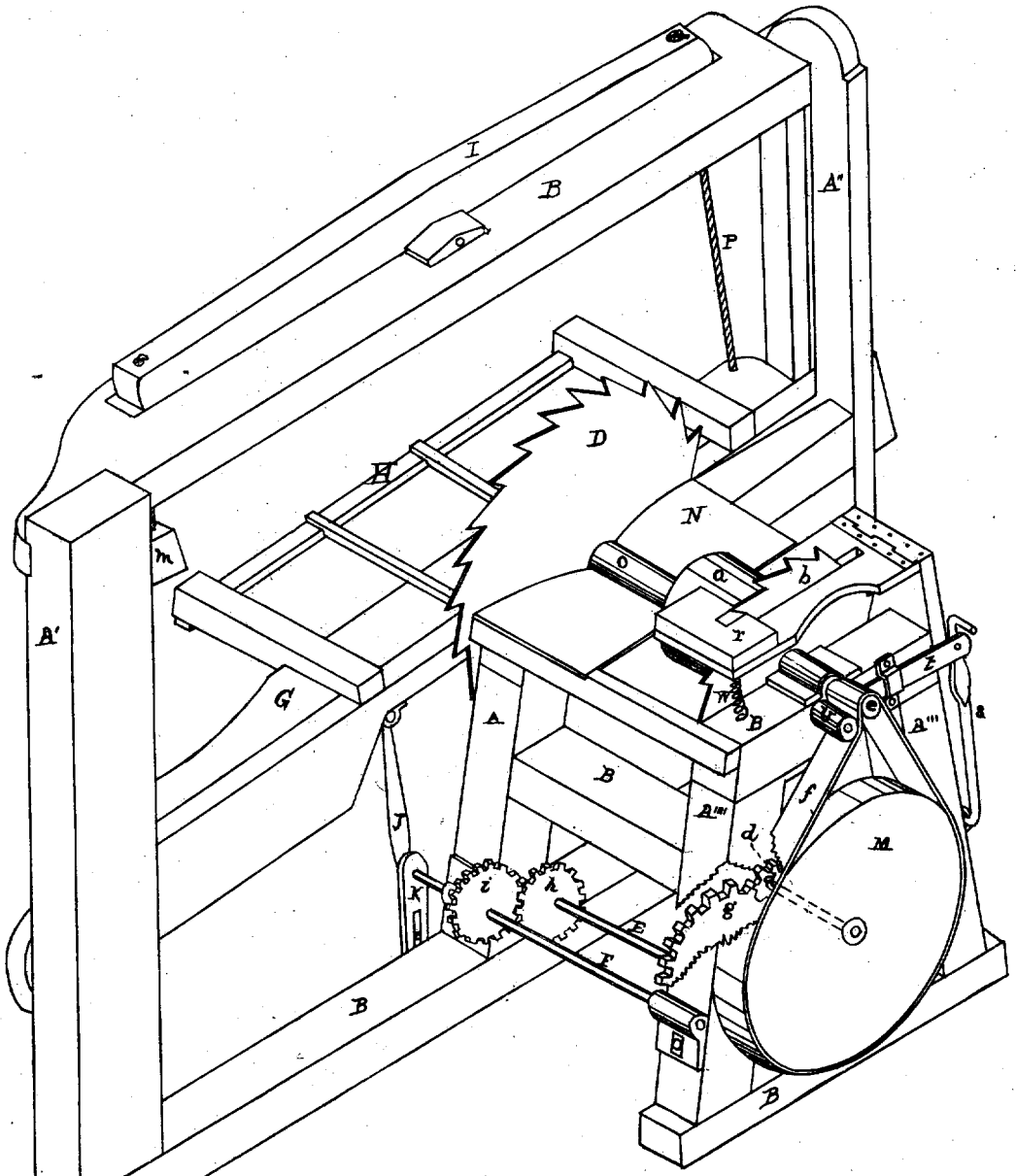
Witness
Fred Foster
John Williams
Inventor
Walter R. Close
Per Wm Franklin Seavey atty
A.M. PHOTO-LITHOGRAPHIC CO. N.Y. (OSBORNE'S PROCESS.)

UNITED STATES PATENT OFFICE.

WALTER R. CLOSE, OF BANGOR, MAINE, ASSIGNOR TO HIMSELF AND THOMAS N. EGERY, OF SAME PLACE.

IMPROVEMENT IN SHINGLE-MACHINES.

Specification forming part of Letters Patent No. 91,826, dated June 29, 1869; Reissue No. 4,371, dated May 9, 1871.

*To all whom it may concern:*

Be it known that I, WALTER R. CLOSE, of Bangor, in the county of Penobscot and State of Maine, have invented a new and useful Improvement in Shingle-Machines; and I hereby declare the following to be a full, clear, and exact description of the same, which will enable others to make and use my invention, reference being had to the accompanying drawing, forming a part of this specification, in which is shown a perspective view of my invention.

My invention relates to that class of shingle-machines in which the shingle-bolt carriage has a vertical or up-and-down motion; and it consists in part in an improved method of communicating said motion to the carriage. My machine has also connected with it a jointing-saw for the purpose of jointing the shingles after they are sawed, and the rising and falling of the carriage is so regulated that this jointing may be done when the carriage is rising and the shingle-saw is not employed, enabling one attendant to perform both operations without losing time or stopping the machine.

It further consists in an improved method of counteracting the weight of the shingle-carriage, so that it may be more easily raised by the devices for communicating to it its vertical motion. This shingle-carriage is placed upon a bed, G, which is pivoted to one of the standards of the machine at one end, the other extremity moving in a vertical slot in the opposite standard, A, which serves as a guide for it.

I will now explain my machine by reference to the drawing.

Upon a suitable frame-work composed of the uprights A A′ A″ A‴ A⁗ and cross-pieces B B B B B, I place the shaft O, having upon it the pulleys *a* *e* and both the shingle and jointing saws D *b*. The pulley *e* is connected with a second pulley, M, by the belt *f*. This pulley M is provided with a small geared wheel, *d*, which meshes into a larger geared wheel, *g*, upon the shaft E. (A part of the machine is shown as broken out to exhibit these gears.) Upon the other end of this shaft is an eccentric-gear, *h*, meshing into a second eccentric-geared wheel, *i*, upon a shaft, F, which shaft is also provided with a crank, K. With this crank is connected one end of the pitman J, the other end being fastened to the bed G, upon which are placed the shingle-carriage H and the ordinary set-works for presenting the bolt to the saw.

Suppose the bed G to be at its lowest point, and the machine set in motion through its driving-pulley *a*. This motion is transmitted through the pulleys *e* and M, and thence by the gears *d* and *g* to the shaft E and eccentric-gear *h*. Said gear *h*, engaging by its longer radius the shorter radius of the eccentric *i*, communicates thereto an accelerated velocity. The shaft F carries the crank K rapidly upward, and by means of the pitman J raises the bed G, upon which the shingle-carriage rests. The shingle-bolt is thus carried rapidly upward until the same is elevated higher than the saw. The set-works are then actuated by a ratchet or other suitable contrivance, and the shingle-bolt is set over. When this is accomplished, the eccentrics *h* and *i* have so far revolved that the eccentric *h*, by its short radius, engages the eccentric *i* by its long radius, drawing down the bed and carriage with diminished velocity, and presenting the shingle-bolt to the saw from the top.

To assist the above devices for raising the bed or arm G in their work, I provide a walking-beam, I, having a weight, *m*, attached to one end, the other being connected with the free end of the arm G, thus nearly balancing it and enabling it to be easily raised.

I hinge the movable rest *r* to the upright A‴, to which is also attached the bent lever *s*, which may be operated from either side of the machine. Said lever *s* is provided with the slide *t* and roller *v*, for tightening the belt *f* upon the pulleys *e* M. The shingle having been sawed, it falls upon the table N. It is then placed by the operator upon the rest *r*, with the edge projecting slightly over the slot. The rest *r*, when not in use, is kept above the saw *b* by the spring W. The operator then presses down the rest *r* until the shingle is presented to the saw *b* from above and is jointed.

The boxes for all the gearing and for the pulley M are slotted, and provided with bolts and nuts, so that the shafts may be readily lowered and adjusted. When the saw D has worn down, the shafts are dropped in the boxes. The pitman J has still the same length of stroke, but carries the carriage lower than before—that is to say, lower than the center of the saw. When worn down, the saw in this way is still able to saw a wide shingle.

What I claim as my invention, and desire to secure by Letters Patent, is—

1. The combination, in a shingle-machine, of the gear-wheels *d g*, eccentric-gears *i h*, crank K, and pitman J with a rising-and-falling counterweighted bed or carriage, G, substantially as herein set forth, for the purpose specified.

2. The combination of the pivoted bed G, cord P, and weighted walking-beam I, as and for the purposes set forth.

3. In combination with the above, the shingle-saw D and jointing-saw *b* upon the same shaft, both being driven by the same pulley, as herein described.

W. R. CLOSE.

Witnesses:
THOS. N. EGERY,
WM. FRANKLIN SEAVEY.